United States Patent [19]
Jeong

[11] Patent Number: 6,119,259
[45] Date of Patent: Sep. 12, 2000

[54] METHOD AND APPARATUS OF IMPROVING RELIABILITY OF A DESCRAMBLING OPERATION IN A DVD PLAYER

[75] Inventor: Jong-Sik Jeong, Seoul, Rep. of Korea

[73] Assignee: Samsung Electronics Co., Ltd., Suwon, Rep. of Korea

[21] Appl. No.: 09/030,015

[22] Filed: Feb. 25, 1998

[30] Foreign Application Priority Data

May 9, 1997 [KR] Rep. of Korea ...................... 97-17842

[51] Int. Cl.[7] .................................................. G06F 11/00
[52] U.S. Cl. ............................................. 714/746; 369/32
[58] Field of Search ................................... 714/701, 746, 714/763, 764, 768; 369/32; 711/173

[56] References Cited

U.S. PATENT DOCUMENTS

| | | | |
|---|---|---|---|
| 5,815,472 | 9/1998 | Kuroda et al. | 369/32 |
| 5,917,914 | 7/1999 | Shaw et al. | 380/42 |
| 5,970,208 | 10/1999 | Shim | 386/126 |
| 5,987,630 | 11/1999 | Yamawaki | 714/701 |

FOREIGN PATENT DOCUMENTS

10032911  11/1998  Japan ............... G11B 20/18

*Primary Examiner*—Albert De Cady
*Assistant Examiner*—Guy Lamarre
*Attorney, Agent, or Firm*—Staas & Halsey LLP

[57] ABSTRACT

A method and apparatus for improving reliability of a descrambling operation of data in a DVD player. The method includes the steps of establishing a bit value corresponding to a predetermined portion of ID data in each of sectors of the data to be descrambled as an initial value for descrambling the data including ID data, the bit value being used during the descrambling of the data; checking an error of the ID data on a basis of the bit value; correcting the error of the ID data if the error is generated in the ID data; and descrambling the data by sector units. As a result, it is possible for a specific bit value to be maintained uniformly in one basic data block and for the specific bit value to have a continuity between basic data blocks, thereby minimizing an erroneous operation due to an error generated in the ID data during the descrambling of the data.

21 Claims, 6 Drawing Sheets

METHOD AND APPARATUS OF IMPROVING RELIABILITY OF A DESCRAMBLING OPERATION IN A DVD PLAYER

BACKGROUND OF THE INVENTION

1. Field of the Invention

The present invention relates to a digital video disk (hereinbelow, referred to as "DVD") player, and more particularly, to a method and apparatus of improving reliability of a data descrambling operation.

2. Description of the Related Art

With the arrival of the multimedia era, a continuing effort is being increased sharply and great progress has been made recently, to transmit various kinds of information more rapidly and accurately through a combination of digital communication technologies. A very large scale integrated (VLSI) circuit and a digital signal processing technique, image, audio and other data which had been produced and processed independently in the past can be processed and used in various forms without distinction of information source or medium. In such surroundings, needs are raised for international transmission standardization of digital data for the purpose of easy information transmission and sharing between different systems.

Consequently, standardization for JPEG (Joint Photographic Coding Experts Group) of ISO/ITU-TSS (International Organization for standardization/International Telecommunication Union-Telecommunication standardization Sector) as well as MPEG (Moving Pictures Experts Group) of ISO/IEC (International Electrotechnical Commission) has been accomplished.

As a result, a digital data compression technique could be developed considerably. Particularly, MPEG-2 can reproduce picture quality of a level received at home at an information transmission rate which is a little less than 10 Mbps presently. Further, the advent of AC-3 for audio compression technique, which enables multi-channel audio reproduction in an audio field, makes it possible to enjoy audio and multi sound of high quality at home. It is expected that a DVD which appeared under such a technical background would play many parts in the functions of a VTR, i.e., a conventional picture recording/reproducing apparatus and a CD-ROM together with a DVD-R will appear in the near future. The DVD as one type of digital moving pictures storing disk media is a widely used type of multimedia storing device having high picture quality and high tone quality.

Figure 1:
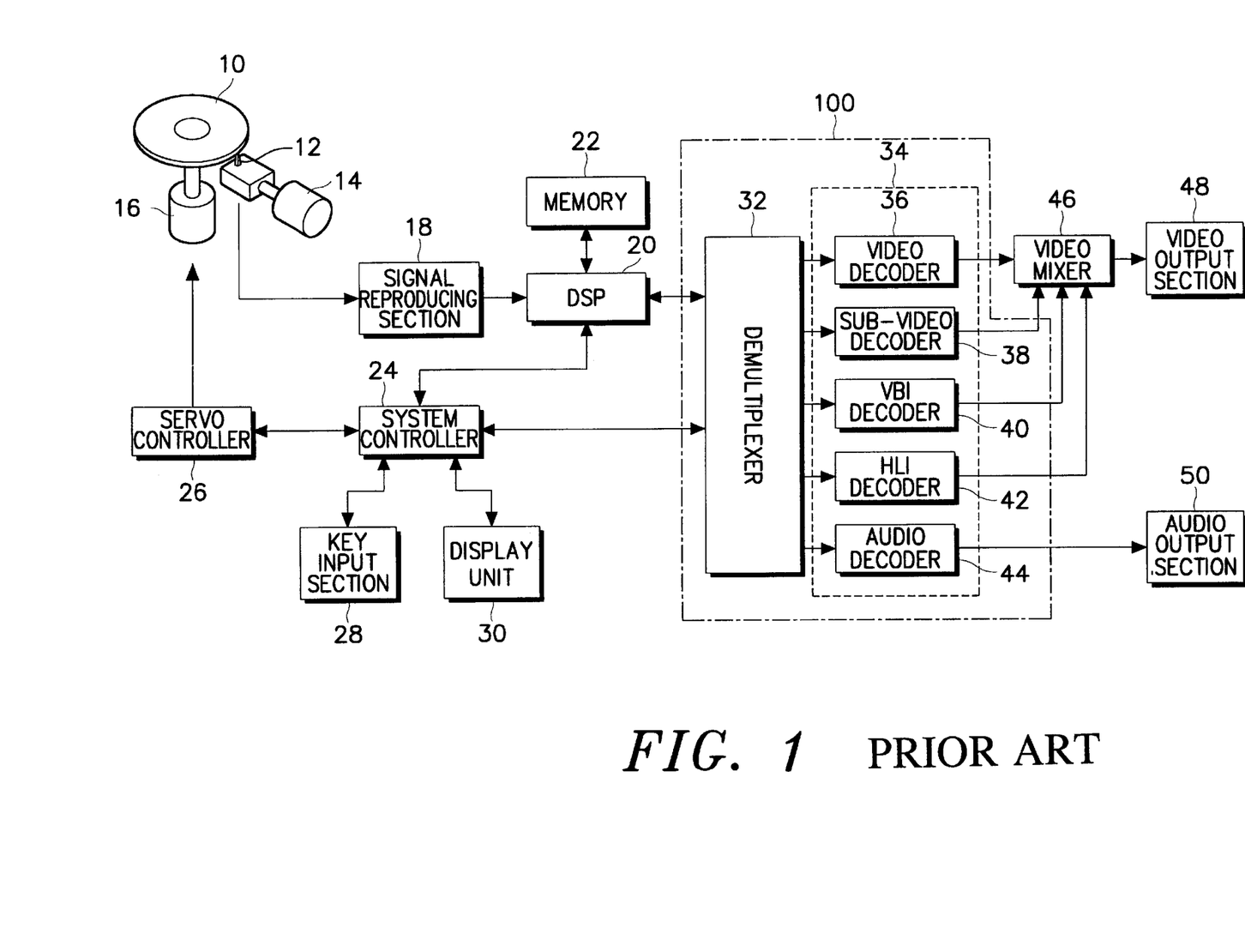
FIG. 1 is a block diagram showing the construction of a conventional DVD player.

FIG. 1 is a block diagram showing the inner construction of a conventional DVD player. Referring to FIG. 1, a digital video disk (hereinbelow, referred to as a "disk") 10 rotates at a predetermined speed by rotation of a disk motor 16. A pickup 12 projects a laser light beam on the disk 10 to readout data therefrom, receives the reflected light beam, and converts the reflected light beam into an analog RF (Radio Frequency) signal. A sled feed motor 14 performs the feeding of the pickup 12. A signal reproducing section 18 executes the reproducing operations of the data recorded on the disk 10, such as amplification of the RF signal output from the pickup 12, noise elimination thereof, conversion of the analog RF signal into a digital signal and sync detection. A servo controller 26 performs control of the disk rotation for an exact readout of the data recorded on the disk 10, a focusing of the pickup 12 and a tracking control. A system controller 24 controls overall operations for reproduction of the data recorded on the disk 10. A memory 22 which is used as a track buffer, and which is connected to a digital signal processor (DSP) 20, stores data processed therein. The digital signal processor 20 16-8-demodulates a signal input from the signal reproducing section 18, executes a phase control operation by PLL (Phase Locked Loop), a descrambling operation, an error detection operation, an error correction operation and the control operation of the memory 22.

Figure 2:
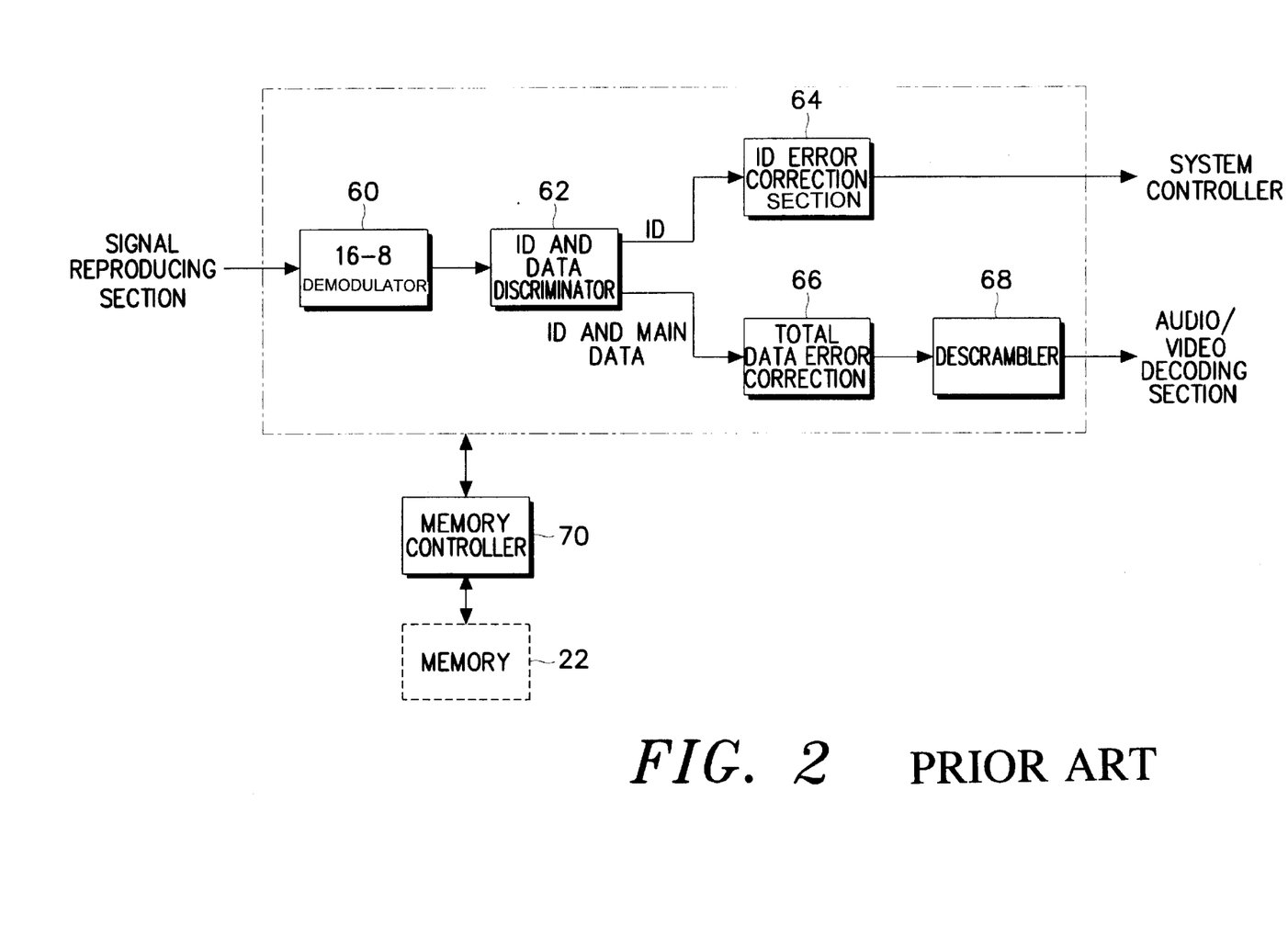
FIG. 2 is a detailed block diagram showing the construction of a digital signal processor shown in FIG. 1.

FIG. 2 is a detailed block diagram showing the inner construction of the digital signal processor 20 shown in FIG. 1. Referring to FIG. 2, the digital signal processor 20 includes a 16-8 demodulator 60 which detects a sync of input data to 16-8 demodulate it, and then stores the demodulated data in the memory 22 under the control of a memory controller 70. An ID error correction section 64 receives ID data indicative of the position of the disk 10 from the memory 22 through an ID and data discriminator 62 and corrects an ID error to supply the corrected ID data to the system controller 24. Error corrected ID data are used for the system controller 24 to control a disk servo. A total data error correction section 66 reads again total data (ID+ main data) stored in the memory 22 to correct an error of the total data, and then stores again the corrected results in the memory 22 under the control of the memory controller 70. The error corrected total data are descrambled in a descrambler 68. The descrambler 68 uses ID data during the descrambling of the total data. The descrambled total data are stored again in the memory 22, and if there is a request for the data from an audio/video decoding section 100, the descrambled total data are supplied to the audio/video decoding section 100 which includes a demultiplexer 32 and an audio/video decoding section 34.

Referring again to FIG. 1, a key input section 28, as a user interface, includes a plurality of keys for instructing the operations such as reproduction, stop, seek. A display unit 30 displays various kinds of display data associated with data reproduction under the control of the system controller 24. An MPEG-2 decoder 34 includes a video decoder 36, a sub-video decoder 38, a Video Blanking Information (hereinbelow, referred to as "VBI") decoder 40 and a High Light Information (hereinbelow, referred to as "HLI") decoder 42 and an audio decoder 44. The video decoder 36 decodes compressed video data and outputs the decoded data in a digital video form to a video mixer 46. The sub-video decoder 38 decodes sub-video information into still pictures and outputs the decoded information to the video mixer 46. The VBI decoder 40 and the HLI decoder 42 decode data of still picture form in such a manner as to conform with a special use and output the decoded data in a digital video form to the video mixer 46. The audio decoder 44 decodes audio data and outputs the decoded data in a digital audio form to an audio output section 50. The video mixer 46 mixes together the outputs of the video decoder 36, the sub-video decoder 38, the VBI decoder 40 and the HLI decoder 42 output in a digital video form, and converts the mixed outputs into a suitable form so that they can be displayed on one screen. A video output section 48 converts the video signals of a digital form into video signals of an analog form and outputs the converted video signals to a monitor (not shown). The audio output section 50 converts audio signals of a digital form into audio signals of an analog form and amplifies the converted audio signals to output the amplified audio signals to a speaker (not shown). A demultiplexer 32, as a data phaser, classifies a type of bit streams, i.e., a video signal, an audio signal and a sub-audio signal and supplies each of the classified signals to the corresponding decoders in the MPEG-2 decoder 34.

In the digital signal processor 20 of such a DVD player, firstly, separate error correction of only ID data improves an exactness of information necessary for detecting the present position on the disk. After that, if the desired position on the disk is detected using the error corrected ID data, desired data are read from the disk, and the read data are stored in the memory 22 until preset total data blocks (182 bites×208 bites) are input to the memory 22. If the total data blocks are stored in the memory 22, the total data error correction section 66 reads the total data stored in the memory 22 to correct errors of the total data. At this moment, the error correction of ID data and main data is carried out simultaneously. The error correction of ID data is performed twice because ID data are very important information indicative of an address of each sector on a disk. However, although the error correction of the total data are carried out exactly, for an actual case, an error may be caused in the ID data due to various factors. If an error is generated in the ID data, the descrambling of data corresponding to each sector on the disk is not executed well.

SUMMARY OF THE INVENTION

It is therefore an object of the present invention to provide a method and apparatus for improving reliability of the descrambling operation of data in a DVD player.

It is another object of the present invention to provide a method and apparatus for preventing an error from being generated from ID data during the descrambling of data in a DVD player.

Additional objects and advantages of the invention will be set forth in part in the description which follows and, in part, will be obvious from the description, or may be learned by practice of the invention.

The above and other objects of the present invention are achieved by providing a method for improving reliability of the descrambling operation of data in a DVD player, including the steps of establishing a bit value corresponding to a predetermined portion of ID data in each of sectors as an initial value for descrambling data including the ID data, the bit value being used during the descrambling of the data; checking an error of the ID data on a basis of the bit value; correcting the error of the ID data if the error is generated in said ID data; and descrambling the data in sector units.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENT

Now, an embodiment of the present invention will be described in detail with reference to the accompanying drawings. Throughout the drawings, it is noted that the same reference numerals or letters will be used to designate like or equivalent elements having the same function. The detailed descriptions on known function and constructions unnecessarily obscuring the subject matter of the present invention will be avoided hereinafter. Technical terms as will be mentioned hereinbelow are terms defined in consideration of the function in the present invention, which may be varied according to the intention of user, so the terms should be defined based on the contents across all of this specification.

Figure 3:
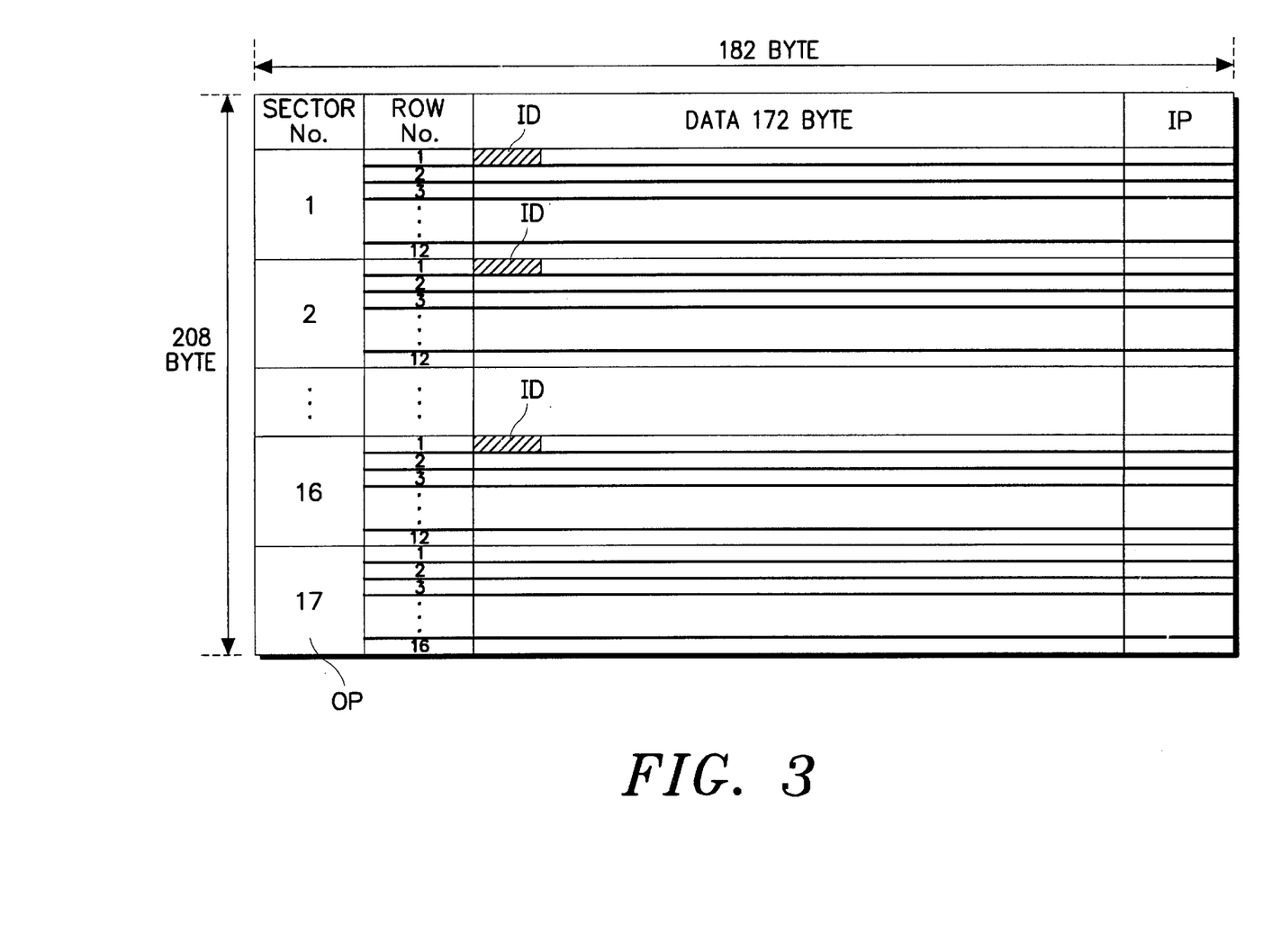
FIG. 3 is a schematic view showing a basic data block form of the memory shown in FIG. 1 according to an embodiment of the present invention.

FIG. 3 is a schematic view showing a basic data block form stored in the memory 22 of FIG. 1.

Referring to FIG. 3, the basic data block includes 182 bytes (length)×208 bytes (width). 172 bytes of the 182 bytes in the latitudinal direction are pure data and the remaining 10 bytes are an inner parity (hereinbelow, referred to as "IP") for the error correction in the latitudinal direction. 192 bytes of the 208 bytes in the longitudinal direction are pure data and the remaining 16 bytes are an outer parity (hereinbelow, referred to as "OP") for the error correction in the longitudinal direction. The 208 bytes in the longitudinal direction has 17 sectors, in which the 192 bytes of pure data correspond to 1st–16th sectors each consisting of 12 bytes, and the remaining 16 bytes of the OP correspond to a 17th sector having 16 bytes. ID data indicative of an address of each data sector on the disk 10 exist in every first part (6 bytes), in which a pure address is 4 bytes and a parity is 2 bytes, Therefore, a total of 16 items of ID data exist in one basic data block as shown in FIG. 3. Each of the ID data is incremented by 1 as a sector number increases. The system controller 24 in FIG. 1 performs various kinds of control operations (e.g., movement of a head to a position on the disk, data reproduction in a desired position on the disk).

Meanwhile, the descrambling of data in the descrambler 68 of FIG. 2 is carried out in a sector unit as shown in FIG. 3. At this moment, bits corresponding to a predetermined portion of ID data in each of the sectors are used during the descrambling of the data read out from the disk 10.

Figure 4:
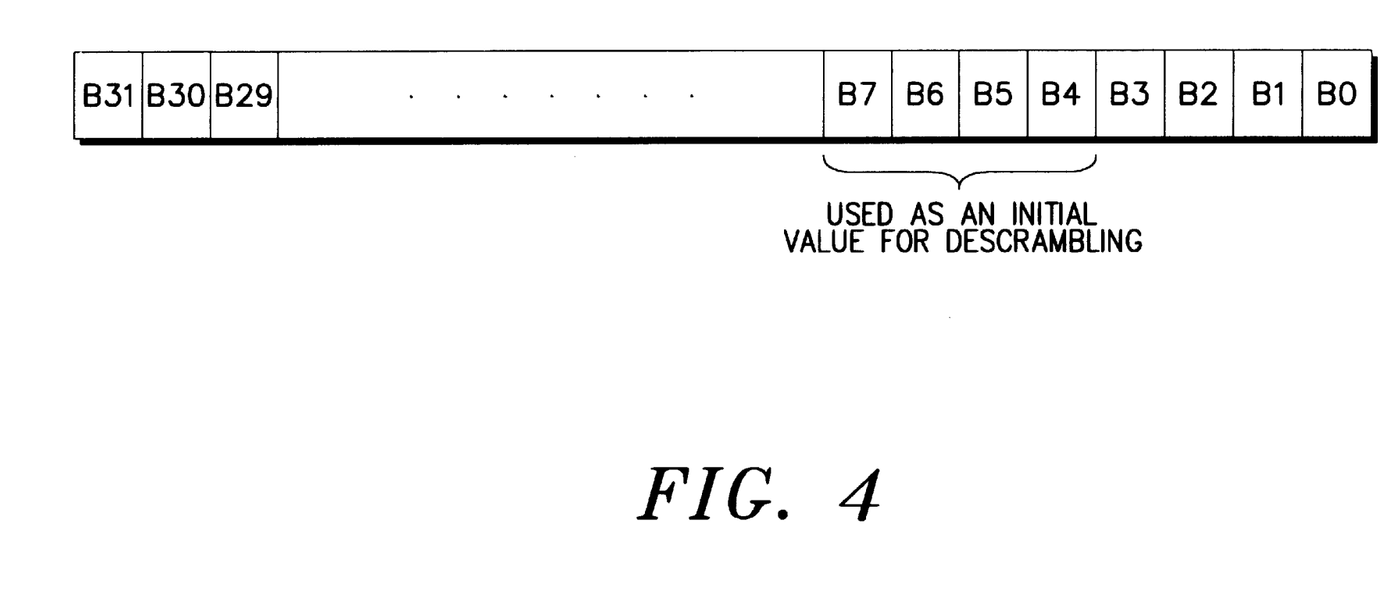
FIG. 4 is a view showing a form of ID data (pure address of 4 bytes) according to the embodiment of the present invention.

FIG. 4 is a view showing a pure address of the ID data (4 bytes=32 bits).

Referring to FIG. 4, bits used during the descrambling of data are B7–B4. The bits B7–B4 have uniform values in one basic data block. This is based on the fact that since one data block has 16 sectors except for the 17th sector of OP for error correction, bits B3–B0 vary, but bits B7–B4 do not vary in one data block. Namely, the bits B7–B4 have uniform values in one data block, and are incremented by 1 in the next data block following the present basic data block. Thus, by incrementing a bit value of the bits B7–B4 in a sector of a present data block by one in the same sector of a next data block, a continuity between the basic data blocks is established.

Therefore, in the embodiment of the present invention, error check and error correction are executed at a front end of the descrambler 68 by using the characteristics that a value of the bits B7–B4 of ID data for one basic data block is maintained uniformly and the bits B7–B4 are incremented by 1 in the next data block following the present basic data block.

Figure 5:
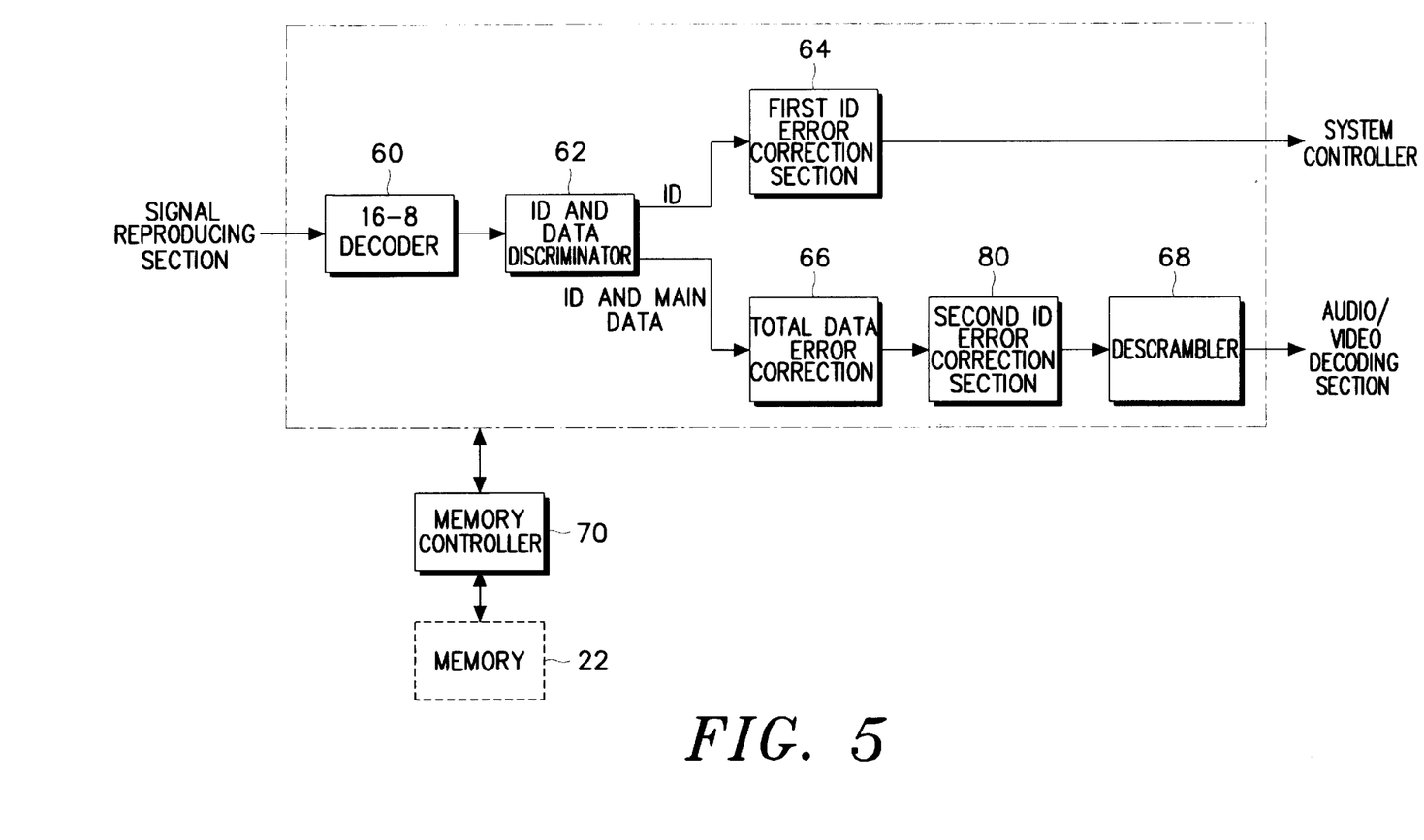
FIG. 5 is a detailed block diagram showing a construction of a digital signal processor (DSP) according to the embodiment of the present invention.

FIG. 5 is a detailed block diagram showing the construction of a digital signal processor (DSP) 20 according to the embodiment of the present invention.

Referring to FIG. 5, the digital signal processor 20 further includes a second ID error correction section 80 for checking and correcting an error of ID data, disposed between the total data error correction section 66 and the descrambler 68. In the embodiment of the present invention, to distinguish an ID error correction section 80 added newly to the digital signal processor 20 from an existing ID error correction section 64 (FIG. 2), the latter is referred to as a first ID error correction section 64 and the former is referred to as a second ID error correction section 80. It is noted that the first existing ID error correction section 64 performs an error correction of a Reed-Solomon code method by using a pure address of 4 bytes and a parity of 2 bytes in ID data. On the other hand, the second ID error correction section 80 controls a value of the bits B7–B4 in the ID data used during the descrambling of data if an ID error is generated in one basic data block, in such a manner as to maintain the value uniformly, and continuously controls the value of the bits B7–B4 in the ID data between basic data blocks if an ID error is generated between the basic data blocks.

Figure 6:
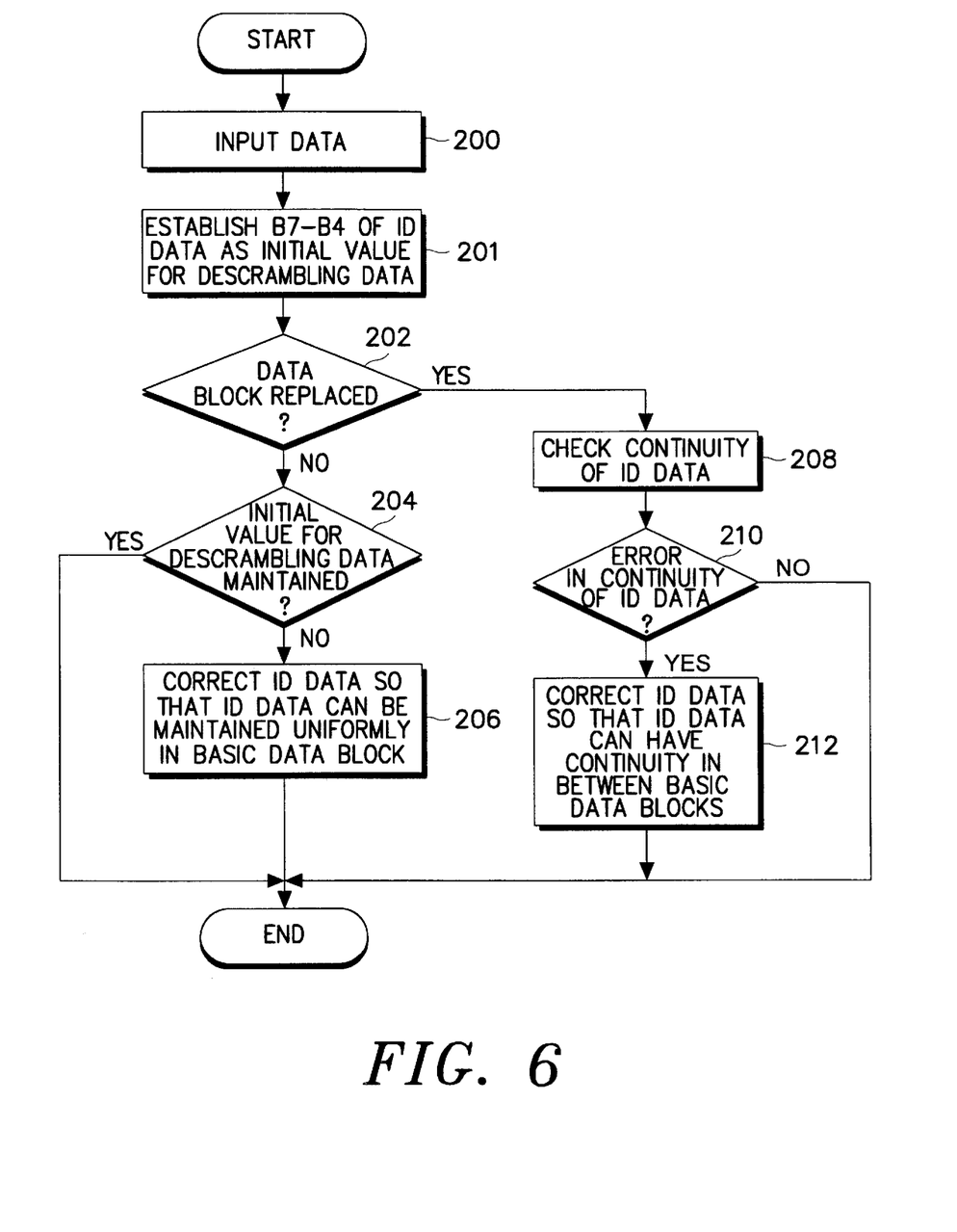
FIG. 6 is a flow chart showing a control operation of a second ID error correction section according to the embodiment of the present invention.

FIG. 6 is a flow chart showing the control operation of a second ID error correction section 80 according to the embodiment of the present invention.

Now, the control operation of the second ID error correction section 80 will be described in detail hereinafter with reference to FIGS. 4 through 6.

The total data error correction section 66 in FIG. 5 reads the basic data blocks (total data=ID+main data) from the memory 22 under the control of the memory controller 70, performs an error correction of the total data and outputs the error corrected total data to the second ID error correction section 80. At step 200, the data output from the total data error correction section 66 are input to the second ID error correction section 80. At subsequent step 201, the second ID error correction section 80 establishes a value of the bits B7–B4 of the ID data in FIG. 4 as an initial value for descrambling data. The program proceeds to step 202, which determines whether or not a data block is replaced by another data block. If it is determined at step 202 that the data block is not replaced by another data block, the program proceeds to step 204, where it is checked whether or not the value (established initial value for descrambling data) of the bits B7–B4 of the ID data in the present data block is maintained continuously. If the answer at step 204 is NO, it is determined that an error is generated in the ID data, and the program proceeds to step 206 where the second ID error correction section 80 controls the value of the bits B7–B4 in the ID data so that the value can be maintained as the established initial value for descrambling data uniformly in the basic data block, and corrects an error of ID data.

If, on the other hand, it is determined at step 202 that the data block is replaced by another data block, the program proceeds to step 208 where the second ID error correction section 80 checks continuity of the ID data. At step 210, a determination is made whether there is an error in the continuity of the ID data. If in step 210, a value of the bits B7–B4 of the ID data between a previous data block and a present data block does not have a continuity, it is determined that there is an error in a continuity of the ID data, and the program proceeds to step 212, where the second ID error correction section 80 controls the value of the bits B7–B4 of ID data so that the value of the bits B7–B4 can have a continuity between basic data blocks based on the established initial value for descrambling data. As a result, the ID data is corrected. Thus, the control operation routine is concluded.

ID error correction by the second ID error correction section 80 makes it possible to improve a reliability of the descrambler 68 at a rear end thereof.

As described above, the present invention has an advantage that it is possible for a specific bit value to be maintained uniformly in one basic data block and for the specific bit value to have a continuity between basic data blocks, thereby minimizing an erroneous operation due to an error generated in ID data during the descrambling of data.

While there has been illustrated and described what is considered to be a preferred embodiment of the present invention, it will be understood by those skilled in the art that various changes and modifications and equivalents may be substituted for elements thereof without departing from the true scope of the present invention. Therefore, it is intended that the present invention not be limited to the particular embodiment disclosed as the best mode contemplated for carrying out the present invention, but that the present invention embraces all alternatives, modifications and variances falling within the scope of the appended claims.

What is claimed is:

1. A method of descrambling data including ID data in a DVD player, wherein the data is divided into sectors, the method comprising the steps of:

establishing a bit value corresponding to a predetermined portion of the ID data in each sector as an initial value for descrambling the data including ID data, said bit value to be used during the descrambling of said data;

checking an error of said ID data on a basis of said bit value;

correcting said error of said ID data if said error is generated in said ID data; and descrambling said data by sector units.

2. The method according to claim 1, wherein said step of checking an error comprises the steps of:

determining whether said bit value maintains a uniform value in one basic data block of the data; and determining whether said bit value continues in a following basic data block of the data.

3. The method according to claim 2, wherein said step of correcting said error comprises the steps of:

controlling said bit value of said ID data so that said bit value is maintained uniformly if said error is generated in said ID data in said one basic data block; and controlling said bit value of said ID data so that said bit value has a continuity if said error is generated in said ID data between said one basic data block and said following basic data block.

4. A digital video disk (DVD) player to read data including identification (ID) data and main data from a digital video disk, comprising:

a demodulator to demodulate the data including the ID data and main data read from the digital video disk, to generate demodulated data;

an ID and data discriminator to discriminate the ID data and the main data from the demodulated data;

a first ID error correction device to correct errors of the discriminated ID data;

a data error correction device to correct errors of the data including the ID data and the main data;

a second ID error correction device to check for errors of the ID data output from said data error correction device by using predetermined bit values in the ID data to be used in descrambling the data, to correct the errors and to generate data including the corrected ID data, if the errors are generated; and a descrambler for descrambling the error corrected data including the corrected ID data.

5. The digital video disk player according to claim 4, wherein said predetermined bit values are values of bits B7–B4.

6. The digital video disk player according to claim 5, wherein said second ID error correction device maintains the same values of the bits B7–B4 in all sectors in a current basic data block of the data, if ID errors are generated within said basic data block, and said second ID error correction device causes the bits B7–B4 between the basic data block and a following basic data block to have continuous values, if the ID errors are generated between the current and following basic data blocks.

7. The digital video disk player according to claim 6, wherein said values of bits B7–B4 are initial descramble values.

8. A method of descrambling data including identification (ID) data and main data read from a digital recording medium in a reproducing device, comprising the steps of:
   checking for and correcting errors in the data including the ID data and the main data, to generate error corrected data having error corrected ID data and error corrected main data;
   checking for and correcting errors in the error corrected ID data only, to generate the error corrected data having twice error corrected ID data and the error corrected main data; and
   descrambling the error corrected data having the twice error corrected ID data and the error corrected main data, using the twice error corrected ID data for initial descramble values.

9. The method as claimed in claim 8, wherein the error corrected data having the error corrected ID data and the error corrected main data is in data blocks each having sectors each including a corresponding predetermined number of bits of the error corrected ID data and the error corrected main data, and said step of checking for and correcting errors in the error corrected ID data only comprises the steps of:
   determining a bit value of the predetermined number of bits in each sector; checking for an error in the error corrected ID data based upon the bit values of the sectors.

10. The method as claimed in claim 8, wherein the error corrected data having the error corrected ID data and the error corrected main data is in data blocks each having sectors each including a corresponding predetermined number of bits of the error corrected ID data and the error corrected main data, and said step of checking for and correcting errors in the error corrected ID data only comprises the steps of:
   determining a bit value of the predetermined number of bits in each sector; and
   determining whether the bit value of the predetermined numbers of bits is a same value in each of the sectors of a current data block, and determining that an error exists if the bit value in each of the sectors is not the same; and
   changing bit values of any sets of the predetermined number of bits which are different from that of the remaining sets of the predetermined number of bits in the current data block, to the bit value of the remaining sets of the predetermined number of bits.

11. The method as claimed in claim 8, wherein the error corrected data having the error corrected ID data and the error corrected main data is in data blocks each having sectors each including a corresponding predetermined number of bits of the error corrected ID data and the error corrected main data, and said step of checking for and correcting errors in the error corrected ID data only comprises the steps of:
   determining a bit value of the predetermined number of bits in each sector; and
   determining whether the bit value of the predetermined number of bits is a same value in each of the sectors of a current data block, and determining that an error exists if the bit value in each of the sectors is not the same;
   changing bit values of any sets of the predetermined number of bits which are different from that of the remaining sets of the predetermined number of bits in the current data block, to the bit value of the remaining sets of the predetermined number of bits;
   incrementing the bit value of the predetermined numbers of bits in each sector of the following data block by a predetermined value; and
   determining whether the bit value of the predetermined numbers of bits in each sector of the following data block is greater than the corresponding bit value in each sector of the current data block, and determining that an error exists if the bit value in the following data block does not exceed the corresponding bit values in the current data block by the predetermined value.

12. The method as claimed in claim 11, further comprising the step of demodulating the data including the ID data and the main data read from a digital recording medium prior to the step of checking for and correcting errors in the data.

13. The method as claimed in claim 11, further comprising the steps of:
   demodulating the data including the ID data and the main data read from a digital recording medium prior to the step of checking for and correcting errors in the data;
   discriminating between the demodulated ID data and the demodulated main data prior to the step of checking for and correcting errors in the data;
   error correcting the demodulated ID data, to generate control data; and
   controlling a disk servo based upon the control data.

14. The method as claimed in claim 8, further comprising the steps of:
   demodulating the data including the ID data and the main data read from a digital recording medium prior to the step of checking for and correcting errors in the data;
   discriminating between the demodulated ID data and the demodulated main data prior to the step of checking for and correcting errors in the data;
   error correcting the demodulated ID data, to generate control data; and
   controlling a disk servo based upon the control data.

15. The method as claimed in claim 8, wherein the error corrected data having the error corrected ID data and the error corrected main data is in data blocks each having sectors each including a corresponding predetermined number of bits of the error corrected ID data and the error corrected main data, and said step of checking for and correcting errors in the error corrected ID data only comprises the steps of:
   determining a bit value of the predetermined number of bits in each sector; and
   incrementing the bit value of the predetermined numbers of bits in each sector of the following data block by a predetermined value; and determining whether the bit value of the predetermined numbers of bits in each sector of the following data block is greater than the corresponding bit value in each sector of the current data block, and determining that an error exists if the bit values in the following data block do not exceed the corresponding bit values in the current data block by the predetermined value.

16. A reproducing device to descramble data including identification (ID) data and main data read from a digital recording medium, comprising:

an error corrector to error correct the data including the ID data and the main data, and to then error correct the error corrected ID data, to generate error corrected data including twice corrected ID data and error corrected main data; and a descrambler to descramble the error corrected data according to the twice corrected ID data.

17. The reproducing device as claimed in claim 16, wherein said error corrector comprises:

a total data correction unit to error correct the data including the ID data and the main data; and an ID error correction unit to error correct the error corrected ID data based upon predetermined bit values of the error corrected ID data.

18. The reproducing device as claimed in claim 17, further comprising:

the error corrected data is in data blocks each having sectors each including a corresponding predetermined number of bits of the error corrected ID data and the error corrected main data; and wherein said ID error correction unit determines a bit value of the predetermined number of bits in each sector of a current data block and a following data block, and checks for an error in the error corrected ID data based upon the bit values of the sectors in the current and following data blocks.

19. The reproducing device as claimed in claim 18, wherein each data block includes 17 sectors, with one of said 17 sectors containing outer parity data for error correction in a longitudinal direction, each of the remaining 16 sectors including 6 bytes of the ID data and 10 bytes of inner parity data for error correction in a latitudinal direction, 4 bytes of the 6 bytes being an address and 2 bytes of the 6 bytes being parity data, wherein said predetermined number of bits are bits B7–B4.

20. The reproducing device as claimed in claim 17, wherein:

the error corrected data is in data blocks each having sectors each including a corresponding predetermined number of bits of the error corrected ID data and the error corrected main data; and said ID error correction unit determines a bit value of the predetermined number of bits in each sector, determines whether the bit value of the predetermined number of bits is a same value in each of the sectors of a current data block, determines that an error exists if the bit value in each of the sectors is not the same, changes bit values of any sets of the predetermined number of bits which are different from that of the remaining sets of the predetermined number of bits in the current data block, to the bit value of the remaining sets of the predetermined number of bits, increments the bit value of the predetermined numbers of bits in each sector of the following data block by a predetermined value, determines whether the bit value of the predetermined numbers of bits in each sector of the following data block is greater than the corresponding bit value in each sector of the current data block, and determines that an error exists if the bit values in the following data block do not exceed the corresponding bit values in the current data block by the predetermined value.

21. The reproducing device as claimed in claim 18, wherein the digital recording medium is an optical disk, the reproducing device further comprising:

a demodulator to demodulate the data including the ID data and the main data read from the optical disk;

an ID and data discriminator to discriminate between the demodulated ID data and the demodulated main data;

a second ID error correction unit to error correct the demodulated ID data, to generate control data; and a servo unit to perform disk servo operations of the optical disk in accordance with the control data.

* * * * *

UNITED STATES PATENT AND TRADEMARK OFFICE
CERTIFICATE OF CORRECTION

PATENT NO.:     6,119,259
DATED     :     September 12, 2000
INVENTOR(S):    Jong-Sik JEONG It is certified that [an/error[s]] appears in the above-identified patent and that said Letters Patent is hereby corrected as shown below:

Column 10, line 31, change "18" to --19--.

Signed and Sealed this

Twenty-fourth Day of April, 2001

Attest:

NICHOLAS P. GODICI

Attesting Officer        Acting Director of the United States Patent and Trademark Office